(12) United States Patent
Dykhno et al.

(10) Patent No.: US 6,388,227 B1
(45) Date of Patent: May 14, 2002

(54) COMBINED LASER AND PLASMA-ARC PROCESSING TORCH AND METHOD

(75) Inventors: Igor Dykhno; Georgy Ignatchenko; Evgeny Bogachenkov, all of Kiryat Byalik (IL)

(73) Assignee: Plasma Laser Technologies Ltd., Yokneam (IL)

(*) Notice: Subject to any disclaimer, the term of this patent is extended or adjusted under 35 U.S.C. 154(b) by 0 days.

(21) Appl. No.: 09/354,265

(22) Filed: Jul. 15, 1999

(51) Int. Cl.$^7$ ............................................. B23K 26/00

(52) U.S. Cl. ........................... 219/121.6; 219/121.45; 219/121.46; 219/121.63; 219/121.64; 219/121.84

(58) Field of Search ........................ 219/121.6, 121.45, 219/121.46, 121.63, 121.64, 121.84

(56) References Cited

U.S. PATENT DOCUMENTS

| | | | | |
|---|---|---|---|---|
| 5,430,816 A | * | 7/1995 | Furuya et al. ................. | 385/33 |
| 5,705,785 A | * | 1/1998 | Dykhno et al. ......... | 219/121.45 |
| 6,172,323 B1 | * | 1/2001 | Ishide et al. .............. | 219/121.5 |

* cited by examiner

Primary Examiner—M. Alexandra Elve
(74) Attorney, Agent, or Firm—Mark M. Friedman

(57) ABSTRACT

A combined laser and plasma-arc welding torch, which joins features of separate laser and plasma-arc welding devices in a single tool. A laser beam is directed by an optic system to be co-linear with the central axis of a plasma-arc torch. The laser beam passes through a group of electrodes, whose longitudinal axes are disposed at acute angle to the torch central axis on the generatrix of a cone, the apex of which lies on the torch central axis close to the section plane of a constricting nozzle, and the base of which faces the main body of the torch. The distance between the central axis and the closest point of the electrode is less than the laser beam radius in a section which is perpendicular to the central axis and passes through this closest point. The distal ends of the electrodes are provided with heat accumulating bulbs and mechanism for individual protection by delivering a separate gas. The electrodes may be cathodes both, anodes, or, cathodes and anodes. The welding torch may be additionally provided with a mechanism for additional constricting and stabilization of a plasma jet. Such a mechanism includes grooves arranged on the conic outer surface of the constricting nozzle and also on the opposite conic surface, which is immediately adjacent or spaced from the constricting nozzle surface. Gas is forced through a chamber having the electrodes and nozzle at the chamber bottom end. Electrodes heated by the laser radiation cause the gas to be ionized, forming a plasma-arc in the constricting nozzle. The laser beam passing through the nozzle comes to a focus and interacts with the plasma-arc formed between the electrodes and a workpiece. The resulting interaction between the plasma-arc and the laser beam forms a plasma-laser discharge which acts to additionally constrict the laser beam and plasma-arc, causing an increase in the energy density of the welding spot formed on the workpiece.

4 Claims, 7 Drawing Sheets

COMBINED LASER AND PLASMA-ARC PROCESSING TORCH AND METHOD

FIELD AND BACKGROUND OF THE INVENTION

The present invention relates to processing torch devices used for welding, cutting, coating, cladding, and more specifically, to a combined laser and plasma-arc welding torch, and a corresponding method for using the combined laser and plasma-arc welding torch of the present invention, which combines features of laser and plasma-arc welding technologies for producing higher energy density and coupling efficiency for welding workpieces than is achievable by using current configurations of laser and plasma-arc welding devices.

Welding is a vital manufacturing technology in many industries. Welding processes are energy intensive as they require the production of high energy densities in order to create and move a pool of liquid material. In most common welding methods, the energy coupling efficiency between the welding tool and a workpiece is twenty to thirty per cent at best, depending upon the material and welding technology used. Thus, significant economic benefits can be obtained if the coupling efficiency can be increased. Other aspects of the welding process, such as weld quality and productivity are also of interest and can impact the economics of the process. Because all of these factors are in some way dependent upon the energy density, which is incident on the workpiece, much effort has been made to increase this quantity by developing additional technologies and welding tools.

Hereinafter, the term "workpiece" refers to a material, typically, metal, and subjected to a welding process involving the use of a welding torch. Hereinafter, the term "high energy density spot" refers to a very is localized region, or portion, on a workpiece, of highly concentrated energy originating from a welding torch.

One of these technologies, plasma welding, is a process in which a constricted arc is used as an energy source to melt and then fuse two metal pieces together. Plasma welding is routinely used in heavy industry because it can be used to weld thick plates quickly with a single pass, while producing a high quality weld. This technology is based on producing a high temperature partially ionized gas stream by forcing an inert gas through an electric arc. The arc heats the gas to a temperature s where it becomes ionized and conducts electricity.

If an electric field is set up between an electrode and the workpiece, the plasma-arc formed by the ionized gas will impinge on the workpiece and melt the material. In plasma-arc welding, appropriate choices of plasma gas flow rate, arc current, and weld travel speed will create conditions in which the high energy and momentum of the plasma-arc produces a dynamic pressure which causes the arc to penetrate the molten pool of material, forming a small hole which penetrates completely through the base metal. The hole is termed a "keyhole" and the welding technique in which such a feature is formed is termed is "keyhole welding". In the keyhole technique, molten metal is displaced to the top surface of the bead of material by the plasma vapor as the vapor penetrates the material and forms the keyhole. As the plasma-arc torch is moved along a weld joint, metal melted at the front of the keyhole flows around the plasma-arc to the rear to form a weld pool. The principal advantage of this form of welding is the ability to perform relatively fast welding of materials with a single pass, with minimal preparation of joints. In addition, a general benefit of plasma welding is that it reduces stress or deformation in the workpiece because the plasma-arc is concentrated inside the keyhole.

FIG. 1 shows the components of a typical prior art plasma-arc welding torch 10. Torch 10 is composed of an electrode 12, which is recessed inside of, and surrounded by, a constricting nozzle 14 having an exit orifice 15. The space formed in-between electrode 12 and nozzle 14 is referred to as the plenum chamber 16. Nozzle 14 is partially surrounded by an outer or shielding gas nozzle 17.

In the operation of torch 10, an electric current is set up between electrode 12 and workpiece 18 or between electrode 12 and nozzle 14. An orifice gas is forced into plenum chamber 16, thereby surrounding electrode 12. The orifice gas becomes ionized in the electric arc, thereby forming plasma. The plasma issues from orifice 15 as a plasma-jet 20 and impinges on workpiece 18. Because electrode 12 is recessed inside plenum chamber 16, plasma-jet 20 is collimated and focused by constricting nozzle 14 (and the electric field set up between electrode 12 and workpiece 18 if such is the case) onto a small region of workpiece 18. This serves to increase the energy density on workpiece 18. An auxiliary shielding gas is commonly forced through outer nozzle 17 and is used to blanket the region on workpiece 18 at which the plasma-jet 5 impinges in order to reduce atmospheric contamination of the melted material pool formed by the jet.

Even though plasma-jet welding has many important advantages as a welding method, there are several serious limitations to plasma welding technology. The depth of keyhole penetration and therefore weldable material thickness, as well as the achievable welding speed, are limited by the energy density of the plasma-are. In addition, the keyhole may collapse under some operating conditions, thereby creating an obstacle to finishing the weld joint. Another limitation is that plasma instabilities and plasma width restrict the use of the technique to certain types of materials.

In plasma welding, the energy density at the location of the workpiece is the most important parameter in establishing the keyhole. The keyhole forms under a range of welding currents from 10 to 250 amps, depending on the material and velocity of the workpiece with respect to the welding torch. In addition, the available energy density in the plasma-arc and therefore into the heated spot on the workpiece depends on the mechanisms of heat transfer within the plasma-arc.

In this regard, there are three modes of heat transfer loss from the plasma-are to the environment: convection, conduction, and radiation. These modes of heat transfer reduce the temperature of the plasma-arc, and consequently the energy density at the workpiece. The conduction mechanism is usually negligible under most operating conditions. When the plasma-arc operates at relatively low temperature, convective heat losses to the environment are dominant. However, as the temperature of the arc increases, radiative heat losses, which are proportional to the fourth power of temperature, become dominant. An equilibrium condition exists in which any increase in plasma-arc energy due to dissipative electrical current flow and temperature is offset by the radiative losses. This condition limits the maximum power density of the plasma welding process, thereby limiting the ability to weld thicker plates or increase the welding speed, and therefore the productivity of this welding process.

During normal plasma-arc welding, radiative heat transfer becomes dominant for currents of about 200–250 amps, and plasma power densities of about 3–3.5 kilowatts. It is physically impossible with existing technologies to achieve higher power densities with plasma welding. Any attempt to increase power density by increasing power consumption from the welding torch leads to a reduction in welding efficiency. If higher speed welding is attempted, the plasma-arc becomes unstable and poor quality welding results. High-speed plasma welding is difficult to achieve because the heating spot on the workpiece quickly falls behind the welding torch axis. Such spatial instability is a reason for poor weld quality.

Another type of welding process, which can achieve high energy densities at a weld point on a workpiece, is laser beam welding. This welding process also relies on forming a keyhole in the material to be welded and has found many applications in industry. In terms of the power density applied to the workpiece, laser beam welding can be compared with electron beam welding. The advantage of laser beam welding is that it can be performed in ambient air as well as in different atmospheric conditions, while electron beam welding requires a vacuum. The atmosphere through which the laser beam is propagating can be adjusted to optimize the energy transfer to the workpiece and hence to optimize the welding process. Laser beam welding in the keyhole mode provides a relatively large penetration depth, which allows welding of thicker materials at a relatively high velocity compared to other more conventional welding technologies. Laser beam welding is also very precise, provides low thermal distortion in the workpiece, and minimizes the need for filler material, thereby providing a cost savings, resulting in a more economically feasible welding technique.

Laser beam welding also has several significant limitations. It typically requires a large, high-powered gas laser, solid state laser, or diode laser to generate and sustain the keyhole. Penetration depth and thickness of weldable material are governed by the power and amount of the laser beam coupled to the workpiece. This suggests that improved performance could be obtained by increasing the laser power. This approach is of limited value due to the formation of laser induced plasma, because such a plasma can reflect the laser beam energy, thereby reducing the amount of energy transmitted to the workpiece.

The transmission of the laser beam to the workpiece is also affected by the composition and propagation properties of this plasma. It is known that metal plasma is essential for maintaining the keyhole during the welding process due to the pressure it generates on the keyhole walls. However, it is detrimental if the plasma's elemental composition or electron density becomes so high as to cause reflection of the laser beam. If its density becomes either too low or too high, the efficiency of the welding process decreases, or the process may cease altogether.

In addition to energy losses from the plasma, laser beam welding is difficult to initiate on materials such as metals because high metal surface reflectivity causes the impinging laser beam to be reflected instead of being delivered to the surface. This normally necessitates the use of significantly higher laser beam powers to establish a keyhole. Once welding is initiated and the keyhole is formed, the metal body acts as a blackbody for laser radiative heating, and the laser energy can be reduced to continue the weld. Improving the amount of laser beam power transmitted to the workpiece, by reducing the amount of reflected energy away from the surface and from the ionized vapor plasma, can substantially increase welding efficiency and reduce power requirements of the laser. Another important limitation is that lasers are inherently very inefficient in terms of the conversion of input power to output power of the laser beam.

During laser beam welding there are several mechanisms by which heat is transferred into the workpiece. The relative significance of each of these mechanisms depends on the energy and power density of the laser beam. Qualitatively, when laser power is less than 1-2 kilowatts, the laser beam energy is optically absorbed and melts the material at the incident spot. In this situation, heat transfer between the laser beam and the material is governed by the thermal characteristics of the material. The surface reflectivity of the material can severely reduce the fraction of the laser energy transmitted to the surface. The effective coupling of the laser energy to the workpiece in this case is on the order of 5–10%.

When laser beam power is greater than approximately 1–2 kilowatts, the material surface reaches its boiling point temperature and a metal-vapor plume forms. The exact transition of power, from the surface heating mode to the keyhole mode, occurs at an energy level that depends on the power of the laser beam, the welding velocity, and the thermal characteristics of the material. The plume recoil pressure causes penetration of the laser beam energy through the molten metal to form a keyhole. The laser beam now passes into the keyhole and delivers energy to the workpiece by radiative heat transfer. In this case, absorption of the laser beam into the welding pool is much higher than when the laser beam interacts with the reflective surface because the keyhole acts as a black body (higher by 70% in some ideal cases). However, in this mode, as the material vaporizes and the plasma link is established, the plasma may become too hot and shield the laser energy from the surface. Although laser beam welding is normally done in the keyhole mode, instabilities, especially when operating near the threshold energy level, or when the welding velocity is too great, can cause a collapse of the keyhole leading to significant production problems.

An apparatus for reducing the amount of laser light reflected from a metal workpiece is described in U.S. Pat. No. 4,689,466, entitled "Laser-beam Operated Machining Apparatus". This patent describes a welding device in which a laser beam is forced through a non-constricted nozzle and allowed to impinge on a workpiece. An annular electrode is placed on the end of the nozzle to permit the formation of an electric arc discharge between the electrode and the surface of the workpiece. An auxiliary gas is forced through the nozzle and is transformed into plasma as it is ionized by the electric arc. The plasma absorbs a portion of the reflected laser light, and transfers this portion of absorbed energy to the surface of the workpiece. In this manner, some of the energy normally lost due to reflection is captured and applied to the process of forming the weld, thereby increasing the efficiency of the process. Thus, in this welding apparatus, the coupling efficiency between the laser torch and to the workpiece, based on the amount of energy produced by the laser torch, is increased by forming a localized plasma which returns some of the reflected energy which would normally be lost.

The aforementioned patent describes an apparatus in which a laser beam interacts with a non-constricted arc, therefore, the temperature of the plasma is lower than that of the plasma-arc. As a result, the absorption coefficient describing the absorption of the laser beam into the non-constricted arc is relatively low. Therefore, significant absorption of laser energy into the arc will generally occur only when high powered lasers (such as gas lasers) are used. This can be a disadvantage in situations where such lasers are too costly to use for a specific application.

In addition, as mentioned previously, the surface of the material to be welded may reach its boiling point temperature, producing a metal-vapor plume. This plume can act to shield the laser beam from reaching the surface of the material, leading to difficulties in carrying out the welding process. Furthermore, the electric-arc dynamic pressure may not be sufficient to initiate the keyhole mode of operation, especially when lower powered solid state lasers, gas lasers, or diode lasers are used.

Several groups of researchers have investigated the possibility of increasing laser welding efficiency by augmenting an electric-arc welding device with a laser beam. In a recent approach described in U.S. Pat. No. 5,866,870, the arc passes under the laser beam at an angle and is located slightly in front of the beam. The combined welding capability is higher than if the energy of the laser beam is simply added to the energy of the arc. A possible explanation for the improved efficiency is that the heating of the workpiece causes an increase in the absorption coefficient of the material. The combined effect is achieved only if the welding torch is capable of producing sufficiently high energy density at the location of a workpiece, thereby coupling a greater percentage of the energy produced by the welding torch to the workpiece, than is presently achievable by separately applying plasma-arc or laser welding torches.

Combination laser and plasma-arc welding torches are described in U.S. Pat. Nos. 5,700,989 and 5,705,785, and are illustrated in FIGS. 2–3. These welding torches 30 (FIG. 2) and 30' (FIG. 3) combine features of both laser and plasma-arc welding torches. For example, in FIG. 2, a laser beam 34 is directed by an objective lens 32 to be co-linear with the central axis 31 of plasma-arc torch 30. Laser beam 34 passes through a planar or conical cathode electrode 36 located at the bottom orifice of torch 30. A coaxial aperture 37 having a diameter less than that of laser beam 34 is drilled into cathode 36, enabling laser beam 34 to pass through cathode 36. A constricting nozzle 40 extends beyond cathode 36, wherein laser beam 34 passes through the central axis of is nozzle 40. An outer or shielding nozzle 42 surrounds constricting nozzle 40, with space 41 in between the two nozzles being used to inject a shielding gas. As with a standard plasma-arc torch, a gas is forced through a chamber including cathode 36 and nozzle 40 at its bottom end. As cathode 36 is heated by the laser radiation, the shielding gas is ionized and a plasma-arc is formed. As laser beam 34 passes through nozzle 40, it comes to a focus and interacts with the plasma-arc formed between cathode 36 and workpiece 50. The resulting interactions between the plasma-arc and laser beam 34 form a plasma-laser discharge which acts to additionally constrict the laser beam and plasma-arc, and increase the energy density of the welding spot formed on workpiece 50.

Aside from all the indicated advantages of the described torch, it also has specific limitations, such as lower reliability of the cathode operating in atmospheres other than argon and xenon, manufacturing complexities and high costs associated with production of the cathode having the required conical geometry, potential contamination of the cathode aperture by molten metal splatter which may accidentally occur during the welding process, and limited operational configurations using such a cathode powered from an alternating current power source.

There is thus a need for, and it would be useful to have a combination laser and plasma-arc welding torch, and a corresponding method, for producing a high energy density and coupling efficiency for welding workpieces, and having features for overcoming above described limitations of currently used configurations of laser and plasma-arc welding torches.

SUMMARY OF THE INVENTION

The present invention is of a combination laser and plasma-arc welding torch, and a corresponding method for using the combination laser and plasma-arc welding torch of the present invention, which combines features of laser and plasma-arc welding technologies for producing higher energy density and coupling efficiency for welding workpieces than is achievable by using current configurations of laser and plasma-arc welding torches.

According to the present invention, there is provided a torch used for welding, combining laser and plasma-arc technologies, and capable of efficiently producing high energy densities at the surface of a workpiece, including: (a) a main body having an inner cavity, optically transparent input and output ends and a central axis; (b) a source of an input laser beam; (c) a first mechanism for directing the input laser beam co-linearly with the central axis, said input laser beam having a beam radius at said optically transparent output end; (d) an electrical insulating bush being disposed at the output end of the main body, including: (i) an aperture co-linear with the central axis, (ii) at least one cavity for locating an electrode, and (iii) an output end; (e) a constricting nozzle having a proximal end and a distal end, the constricting nozzle being located at the insulating bush output end, the constricting nozzle having a through aperture being centered on the central axis and a section plane of the distal end, the section plane being perpendicular to the central axis, the through aperture of the constricting nozzle having a radius greater than to the input laser beam radius; (f) at least one electrode being located in a cavity of the insulating bush and having a longitudinal axis intersecting the central axis close to the section plane of the constricting nozzle, at least one electrode longitudinal axis and the central axis forming an acute angle which faces the main body; (g) a second mechanism for providing a plasma gas inside the torch, in a region between the constricting nozzle and the at least one electrode; and (h) a third mechanism for forming an electric arc between the at least one electrode and the workpiece, thereby causing the plasma gas to become plasma issuing from the constricting nozzle and interacting with the laser beam issuing from the main body to form a combined plasma laser discharge.

According to further features in preferred embodiments of the invention described below, the torch further includes: (i) a protective nozzle surrounding and concentric with the constricting nozzle, and (j) a forth mechanism for supplying a protective gas into a region between the protective nozzle and the constricting nozzle.

According to still further features in the described preferred embodiments, the at least one electrode further includes: (i) a distal end and a proximal end, (ii) a heat accumulating bulb disposed close to the distal end, and (iii) a forth mechanism for reducing heat transmission to the proximal end of at least one electrode, the mechanism being located between the bulb and the proximal end of the electrode.

According to still further features in the described preferred embodiments, the forth mechanism for reducing heat transmission in the at least one electrode includes a strap disposed between the bulb and the proximal end of the electrode.

According to still further features in the described preferred embodiments, the at least one electrode further includes a mechanism for supplying an inert gas into a region around distal end of the electrode, thereby generating a protective gas envelope around the electrode, the gas envelope increasing stability and life of the electrode.

According to still further features in the described preferred embodiments, the at least one electrode is reciprocable along its longitudinal axis.

According to still further features in the described preferred embodiments, the shortest distance between the central axis and the at least one electrode is less than the laser beam radius in a section perpendicular to the central axis and is located at the distal end of the at least one electrode.

According to still further features in the described preferred embodiments, the torch further includes at least two electrodes disposed in cavities of the insulating bush and having longitudinal axes which intersect the central axis close to the section plane, the longitudinal axes located on a generatrix of a cone, the cone featuring a vertex laying on the central axis, and the cone featuring a base facing the main body.

According to still further features in the described preferred embodiments, the distance between the central axis and closest point of each of the electrodes is less than the laser beam radius.

According to still further features in the described preferred embodiments, the torch includes two electrodes, wherein each of the two electrodes is a cathode.

According to still further features in the described preferred embodiments, the torch includes two electrodes, wherein each of the two electrodes is an anode.

According to still further features in the described preferred embodiments, the torch includes two electrodes, wherein one of the two electrodes is a cathode, and the other of the two electrodes is an anode.

According to still further features in the described preferred embodiments, the mechanism for directing the laser beam includes an optical system having a beam focusing mechanism, the optical system being disposed at the input end of the main body, the laser beam being focused at a point outside the torch and behind the section plane of the constricting nozzle.

According to still further features in the described preferred embodiments, the optical system includes at least one optical element selected from the group consisting of objective lenses and focusing reflectors.

According to still further features in the described preferred embodiments, the source of the input laser beam is at least one laser selected from the group consisting of a solid state laser, a gas laser and a diode laser, the at least one laser operating in a mode selected from the group consisting of continuous and pulse.

According to still further features in the described preferred embodiments, the constricting nozzle has a conic outer surface and a through aperture, the through aperture has an inner surface and a cross section area, and wherein the constricting nozzle is provided with a mechanism for additional constriction and stabilization of a plasma flow.

According to still further features in the described preferred embodiments, the mechanism for additional constriction and stabilization of the plasma flow includes grooves disposed at the conic outer surface and disposed at opposite conic surface spaced from the conic outer surface of the constricting nozzle.

According to still further features in the described preferred embodiments, the mechanism for additional constriction and stabilization of the plasma flow includes grooves disposed at the conic outer surface and at the opposite conic surface immediately adjacent to the conic outer surface of the constricting nozzle.

According to still further features in the described preferred embodiments, at least two of the grooves are uniformly arranged on the conic outer surface of the constricting nozzle parallel to a generatrix of the conic outer surface, the grooves have a total cross section area, the total cross section area being approximately equal to the cross section area of the through aperture of the constricting nozzle.

According to still further features in the described preferred embodiments, the opposite conic surface is an inner surface of through aperture of a protective nozzle, the opposite conic surface is disposed is concentrically to the conic outer surface of the constricting nozzle and spaced from the conic outer surface.

According to still further features in the described preferred embodiments, the torch further includes a conic bush, the conic bush has an inner surface and the conic bush is positioned in a gap between the constricting nozzle and a protective nozzle.

According to still further features in the described preferred embodiments, the inner surface of the conic bush is immediately adjacent to the conic outer surface of the constricting nozzle.

According to still further features in the described preferred embodiments, the mechanism for forming the electric arc between the at least one electrode and the workpiece includes a synchronizing device for synchronizing pulses of the input laser beam with pulses of arc current.

According to still further features in the described preferred embodiments, the mechanism for forming the electric arc includes a commutator for connection of the at least one electrode to the mechanism.

According to still further features in the described preferred embodiments, the torch includes two of the at least one electrode, wherein the mechanism for forming the electric arc includes an alternating current source connected with the two electrodes via two diodes, wherein an anode of first of the two diodes is connected to a negative electrode and to a cathode of second of the two diodes, the cathode of the second diode is connected with a positive electrode.

According to another aspect of the present invention there is provided a method of forming a high-energy density spot on a workpiece having a surface, the method including the steps of: (a) providing a combined laser and plasma-arc welding torch including: (i) a main body having an inner cavity, optically transparent input and output ends and a central axis, (ii) a source of an input laser beam, for inputting the input laser beam through the input end of the main body, (iii) a first mechanism for directing the input laser beam co-linearly with the central axis, the input laser beam having a radius at the optically transparent output end, (iv) an electrical insulating bush disposed at the output end of the main body, including: (1) an aperture being co-linear with the central axis, (2) at least one cavity to locate an electrode, and (3) an output end, (v) a constricting nozzle having a proximal end and a distal end, the constricting nozzle being located at the insulating bush output end, the constricting nozzle having a through aperture centered on the central axis and a section plane at the distal end, the section plane being perpendicular to the central axis, the through aperture of the constricting nozzle having a radius greater than the input laser beam radius, (vi) at least one electrode being located in a cavity of the insulating bush and having a longitudinal axis intersecting the central axis close to the section plane of the constricting nozzle, the at least one electrode longitudinal axis and the central axis forming an acute angle which faces the main body, (vii) a second mechanism for providing a plasma gas inside the torch, in a region between the constricting nozzle and the at least one electrode, and (viii) third mechanism for forming an electric arc between the at least one electrode and the workpiece, thereby causing the plasma gas to become plasma issuing from the constricting nozzle and interacting with the laser beam issuing from the main body to form a combined plasma laser discharge; (b) directing the laser beam along the central axis of the main body, whereby the at least one electrode is heated by the laser beam, and the laser beam is brought into focus at a focal point outside of the main body; and (c) forming a constricted plasma jet in a region between the main body and the workpiece, thereby causing the laser beam and the plasma jet to interact and produce a more highly constricted plasma jet, the more highly constricted plasma jet has a higher energy density for impinging on the workpiece, thereby forming the high energy density spot on the workpiece.

According to still further features in the described preferred embodiments of the method of the present invention, the welding torch further includes: (ix) a protective nozzle surrounding with the constricting nozzle, and (x) a forth mechanism for supplying a protective gas into a region between the protective nozzle and the constricting nozzle.

According to still further features in the described preferred embodiments of the method of the present invention, the at least one electrode is heated by directing the laser beam in a way that the laser beam has a beam radius in a section plane located at the distal end of the at least one electrode, whereby the beam radius is greater than radius between the central axis of revolution and closest point of the at least one electrode.

According to still further features in the described preferred embodiments of the method of the present invention, the constricted plasma jet is additionally constricted and cooled by protective gas jets, the protective gas jets generated by a forth mechanism for additional constriction and stabilization of plasma flow.

According to still further features in the described preferred embodiments of the method of the present invention, for the welding torch having two electrodes, first of the two electrodes is a cathode and second of the two electrodes is an anode, each of the two electrodes is powered by pulsed current, the pulsed current is on when the electric arc ignites a negative pulsed current between the cathode and the workpiece in a circuit where the anode is zero, and the electric arc ignites a positive pulsed current between the anode and the workpiece in the circuit where the cathode is zero.

According to still further features in the described preferred embodiments of the method of the present invention, the mechanism for forming the electric arc includes generating arc current pulse of predetermined frequency and duration, the arc current pulses are applied with a timed pause is whereby a synchronizing device matches the predetermined frequency and the duration of the arc current pulses with pulses of the input laser beam, so that periods of repeating laser beam pulses are equal to periods of repeating arc current pulses, and whereby each laser beam pulse starts during the timed pause between every two successive arc current pulses and ends during second of every two successive arc current pulses.

According to still further features in the described preferred embodiments of the method of the present invention, for the welding torch having two electrodes, the mechanism for forming the electric arc includes generating arc current pulses of predetermined frequency and duration.

According to still further features in the described preferred embodiments of the method of the present invention, for the welding torch including two electrodes, the mechanism for forming the electric arc is connected to a commutator, the commutator connects the two electrodes with a forth mechanism for generating arc current pulses of predetermined frequency and duration.

According to still further features in the described preferred embodiments of the method of the present invention, for the welding torch including three electrodes, the mechanism for forming the electric arc is connected to a commutator, the commutator connects the three electrodes with a forth mechanism for generating arc current pulses having a sequence and frequency, whereby each of the three electrodes is connected during two successive intervals of a complete operation cycle of the commutator.

DESCRIPTION OF THE PREFERRED EMBODIMENTS

Figure 1:
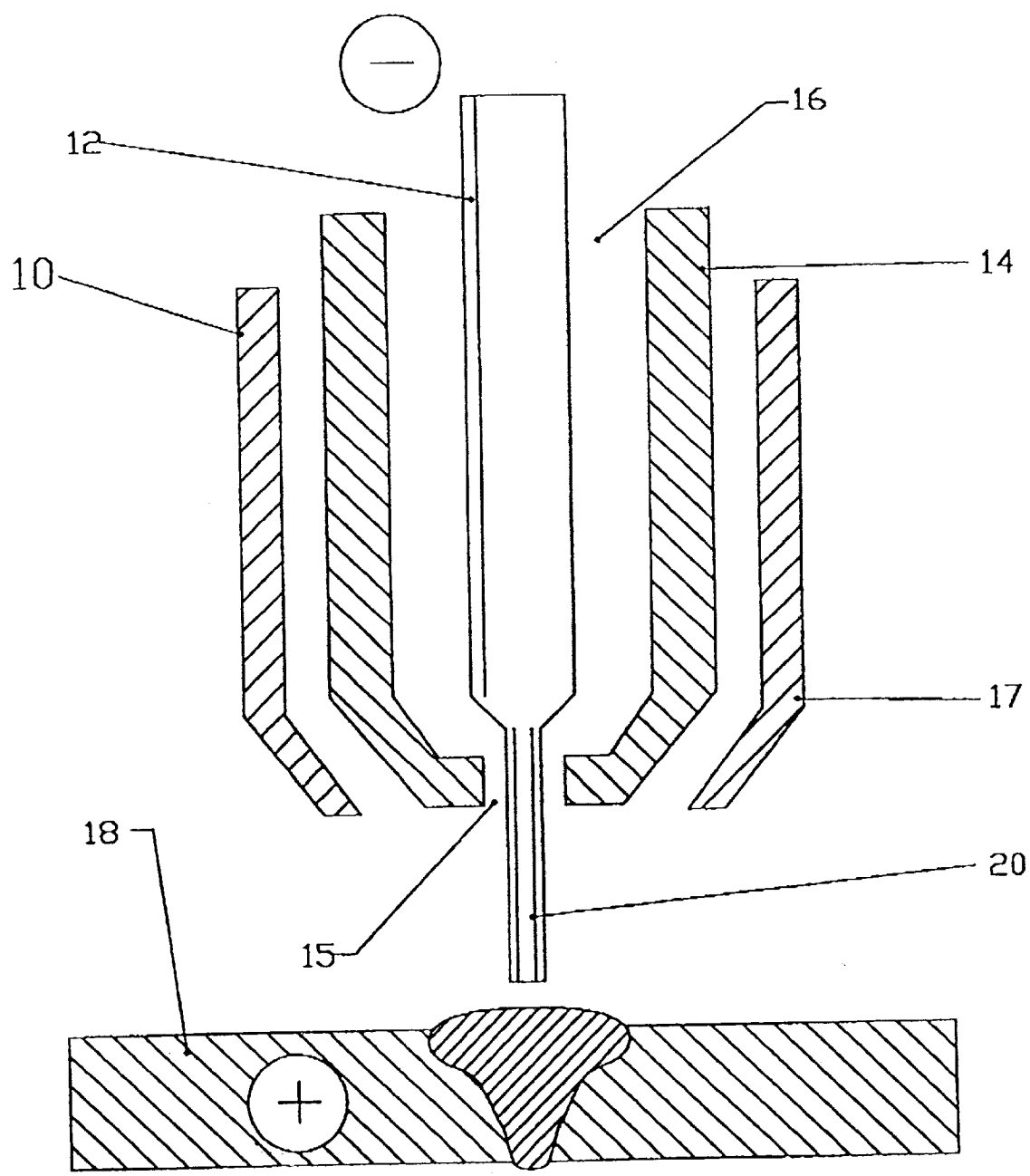
FIG. 1 is a schematic diagram illustrating components of a typical prior art plasma-arc welding torch.
Figure 2:
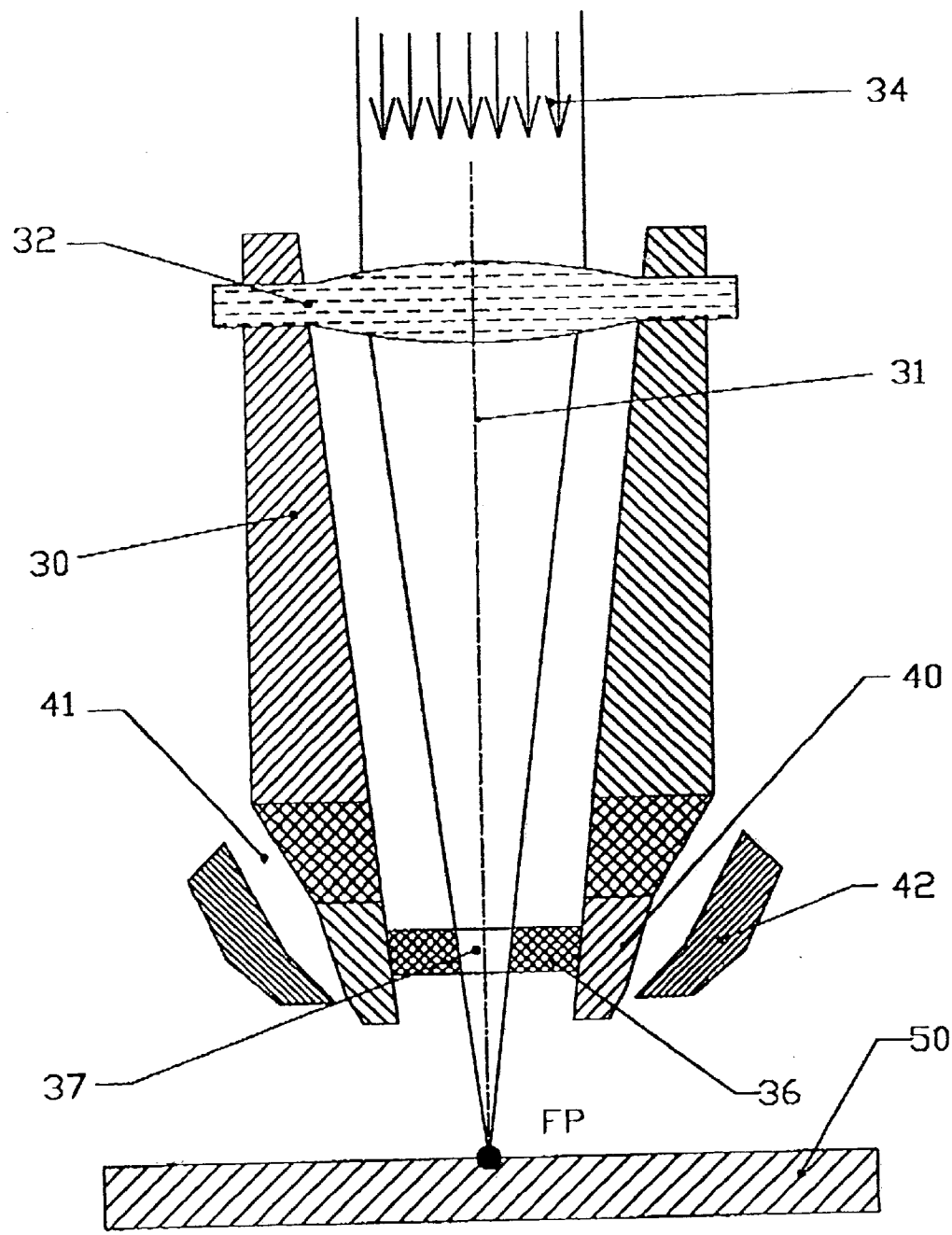
FIGS. 2–3 are schematic diagrams illustrating components of prior art combined laser and plasma-arc welding torches.
Figure 3:
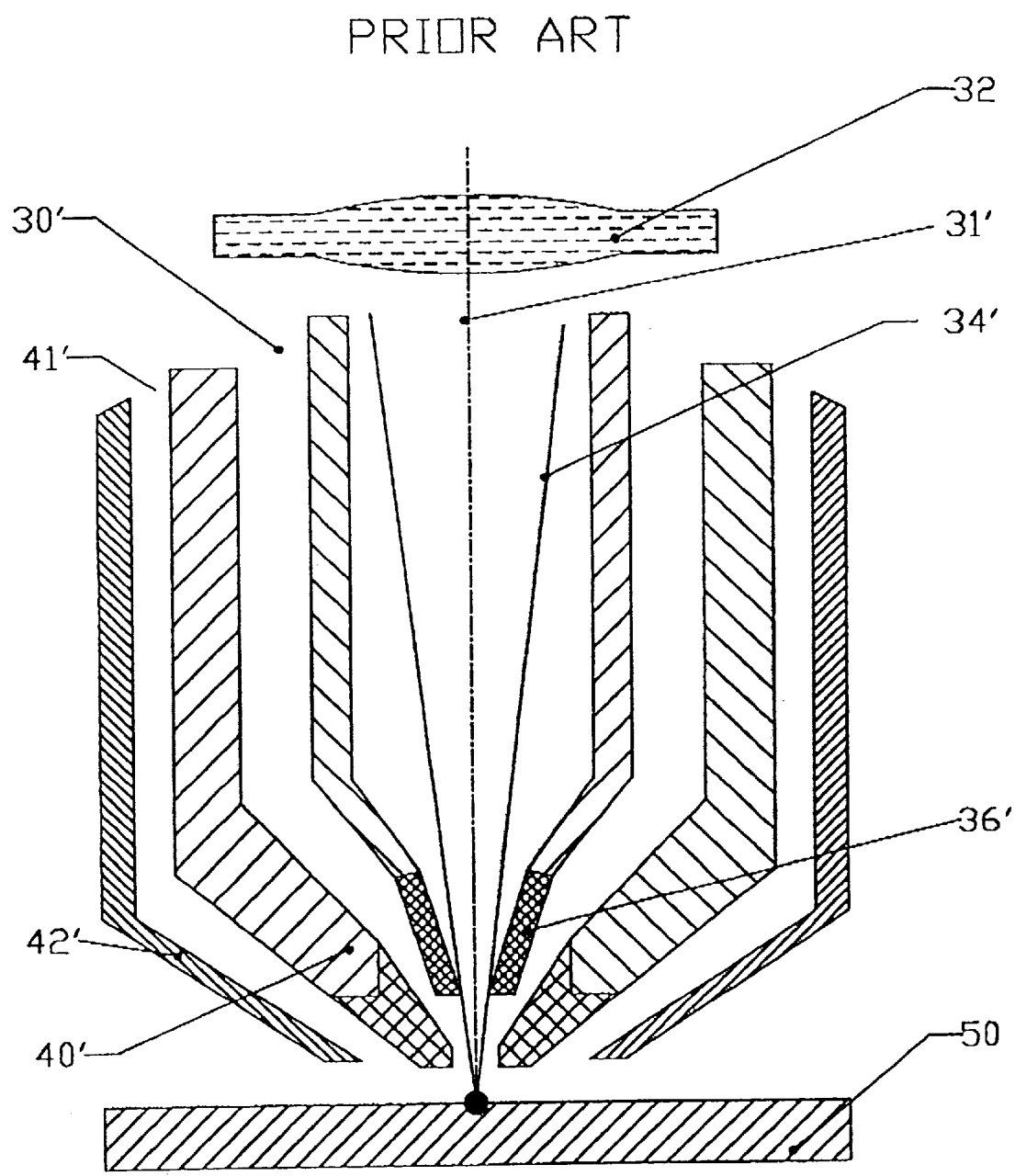

The present invention is of a combination laser and plasma-arc welding torch, and a corresponding method for using the combination laser and plasma-arc welding torch of the present invention, which combines features of laser and plasma-arc welding technologies for producing higher energy density and coupling efficiency for welding workpieces than is achievable by using current configurations of combined laser and plasma-arc welding torches.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Thus, components, operation, and method of implementation of the combination laser and plasma-arc welding torch according to the present invention are better understood with reference to the drawings and the accompanying description. It is to be noted that illustrations of the present invention shown here are for illustrative purposes only and are not meant to be limiting.

Referring now to the drawings, FIGS. 4–7 illustrate preferred embodiments of the combination laser and plasma-arc welding torch of the present invention which is referred to hereinbelow as welding torch 100.

Welding torch 100 of the present invention includes a main torch body 110, having a central axis 111. At one end of main torch body 110 is located an optical system, including an objective lens 112. Lens 112 serves to focus an incoming laser beam 114 so that beam 114 is co-linear with central axis 111 of torch body 110 and is focused at a focal point, FP, located external to torch 100.

Figure 4:
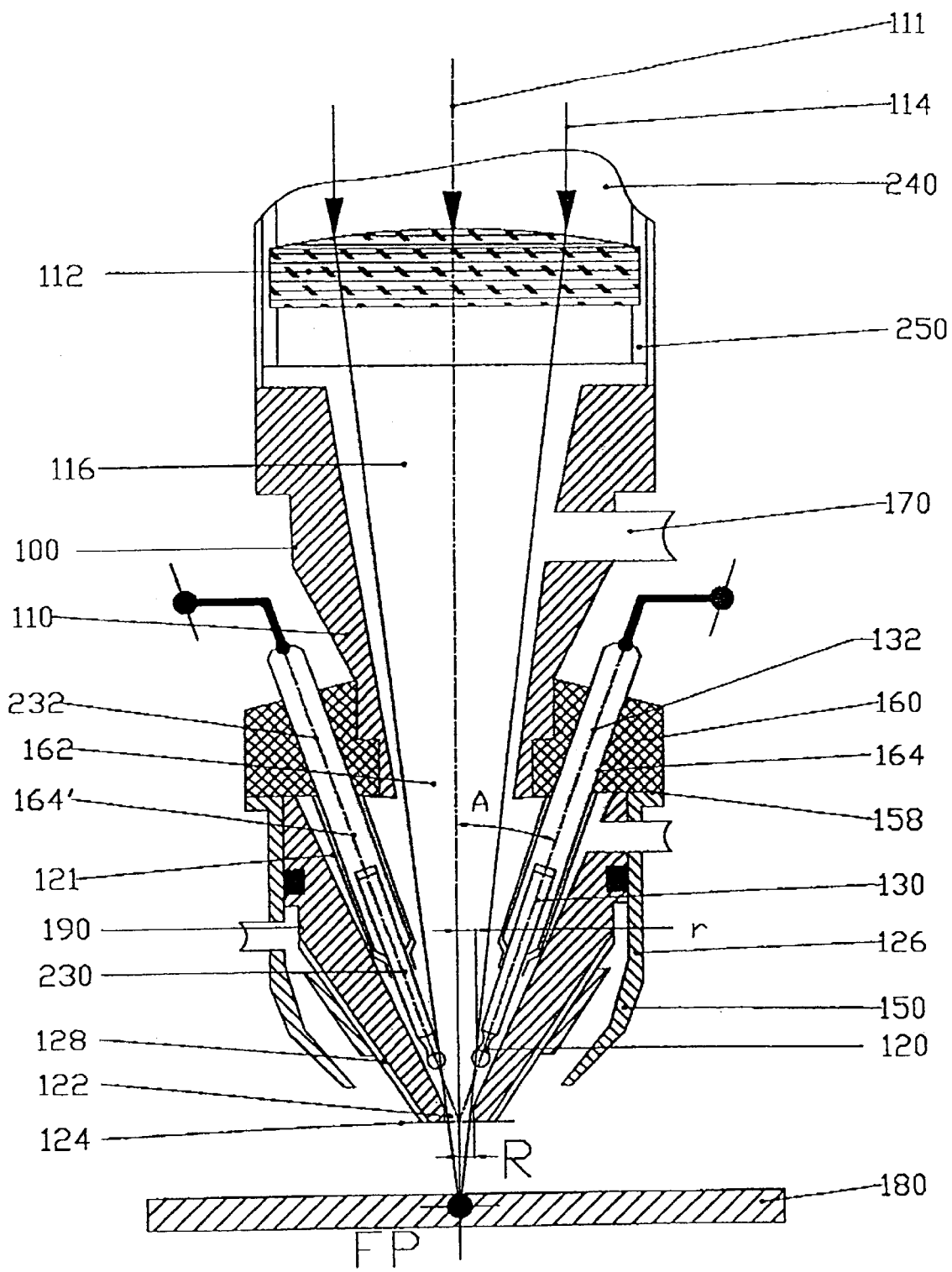
FIG. 4 is a schematic diagram illustrating a cross-section view of a first preferred embodiment of the combined laser and plasma-arc welding torch, in accordance to the present invention.
Figure 5:
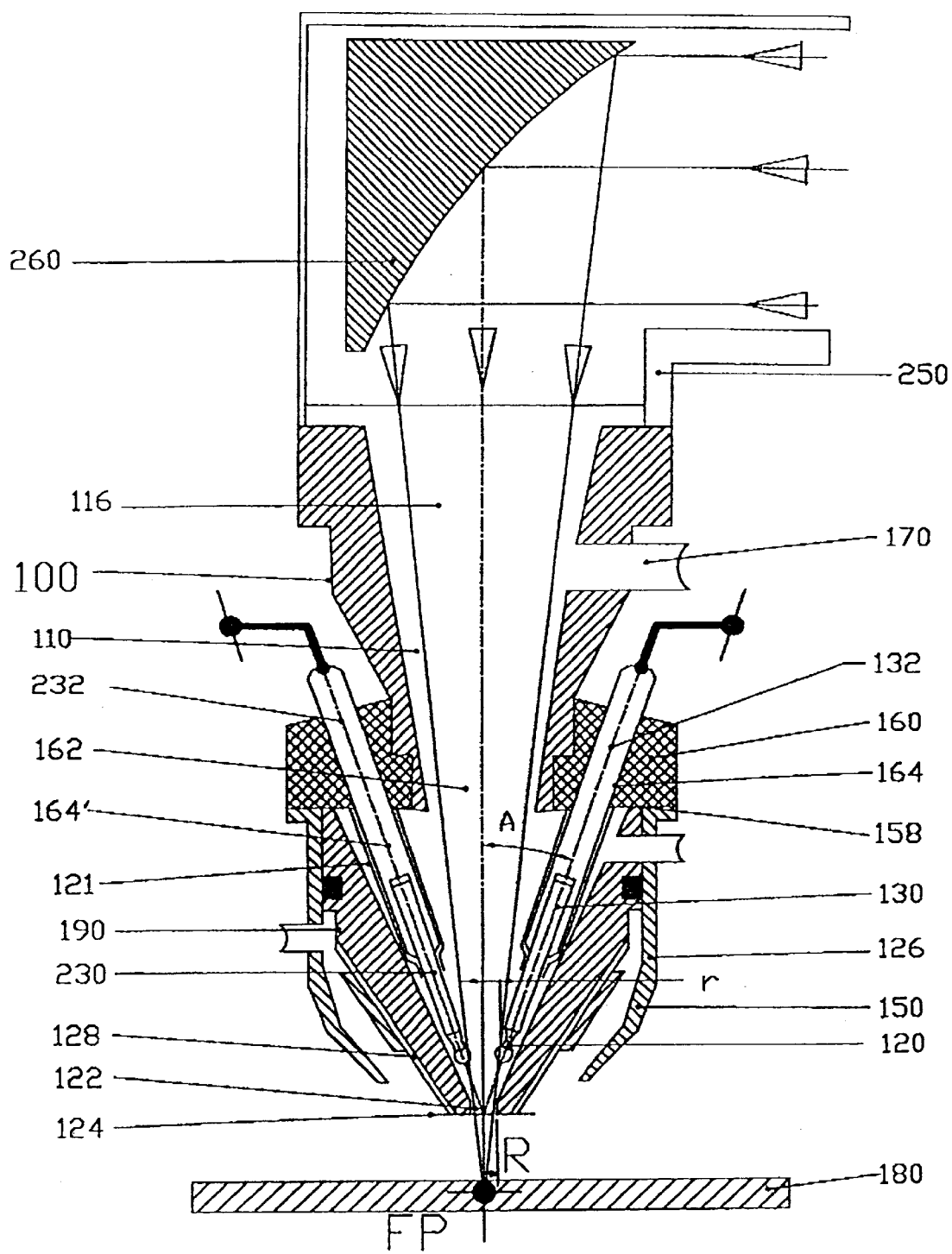
FIG. 5 is a schematic diagram illustrating a cross-section view of a is second preferred embodiment of the combined laser and plasma-arc welding torch, in accordance to the present invention.

In FIG. 4, torch 100 includes constricting nozzle 120, one or two electrodes 130 and 230, a mechanism 140 (shown in FIGS. 6 and 7) for forming an electric arc, a protective nozzle 150, and a channel 190 for supplying a protective gas inside protective nozzle 150. Main body 110 has an inner cavity 116. The mechanism for directing laser beam lens 112 gives laser beam 114 a certain radius r at an aperture constricting nozzle 122.

An insulating bush 160, made from an electrical insulation material, is disposed at the output end of main body 110. Insulating bush 160 has an aperture 162 centered on central axis 111, and two cavities 164 and 164', for placement of electrodes 130 and 230.

Constrictive nozzle 120 includes a proximal end 121 and a distal is end 122, and is disposed at distal end 158 of insulating bush 160. Constricting nozzle 120 includes a through aperture 122 centered on central axis 111. A section plane 124 located at the distal end of constricting nozzle 120 is perpendicular to central axis 111. Aperture 122 of constricting nozzle 120 has a radius R, which is greater than r at aperture 122. Radius R can range between 0.5 and 5 mm, preferably, between 0.5 and 3 mm, more preferably between 1 and 2 mm. Radius r can range between 0.1 and 4 mm, preferably, between 0.15 and 2 mm, more preferably between 0.2 and 1 mm.

In a cavity 164 of insulating bush 160 there are the two electrodes 130 and 230, which have their longitudinal axes 132 and 232 intersecting central axis 111 close to section plane 124 of constricting nozzle 120. Longitudinal axes 132 and 232 of electrodes 130 and 230 and central axis 111 form an acute angle A, which faces main body 110. Angle A can range between 4 and 60 grad, preferably, between 5 and 45 grad, more preferably between 5 and 25 grad, most preferably between 5 and 15 grad.

A mechanism 170 generates a plasma gas inside plasma torch 100, into a region between constricting nozzle 120 and electrodes 130 and 230. Preferably, a mechanism 140 (FIGS. 6 and 7) enables generation of an electric arc between electrodes 130 and 230 and a workpiece 180, thereby transforming the plasma gas into a plasma, which emerges from constricting nozzle 120 and interacts with laser beam 114 also emerging from nozzle 120 to form a combined plasma laser discharge. Torch 100 also includes a protective nozzle 150 surrounding constricting nozzle 120 and concentric with constricting nozzle 120. A channel 190 supplies a protective gas into a region between protective nozzle 150 and constricting nozzle 120.

In FIGS. 4 through 7, each electrode 130 and 230 has a distal end, a proximal end, and a heat accumulating bulb 200 at the distal end. Electrodes 130 and 230 are provided with a mechanism for reducing heat transmission to the proximal end of each electrode 130 and 230. This mechanism is positioned between bulb 200 and the proximal electrode end, and includes a strap 210. Electrodes 130 and 230 include tubes 220 (shown in FIGS. 6 and 7) for supplying an inert gas into the region around the distal end of electrodes 130 and 230, thereby, forming a protective gas envelope which increases stability and lifetime of electrodes 130 and 230. Electrodes 130 and 230 are reciprocable along longitudinal axes 132 and 232. In torch 100, the shortest distance between central axis 111 and closest points of electrodes 130 and 230 is less than radius r of laser beam 114.

Figure 6:
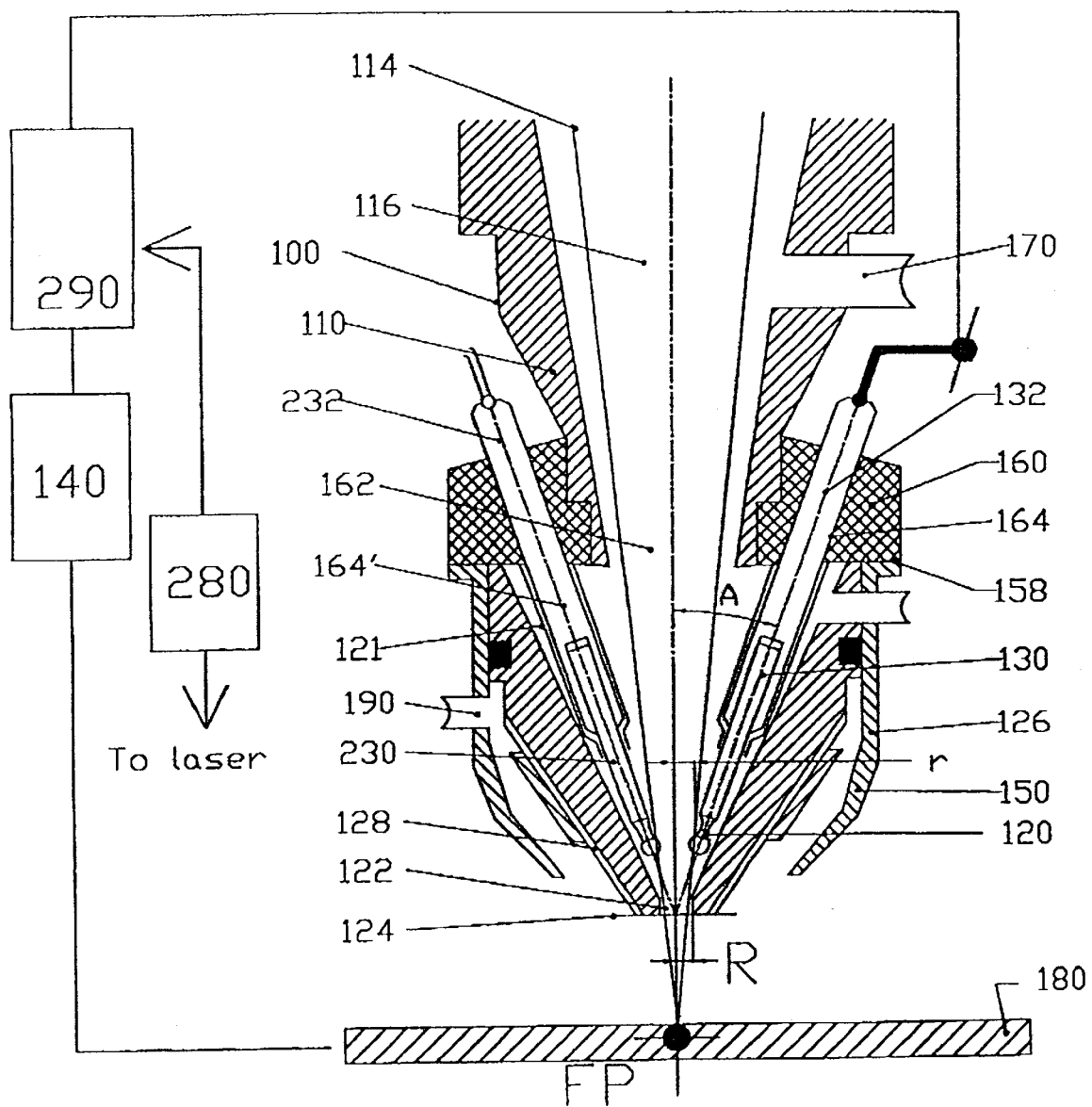
FIG. 6 is a schematic diagram illustrating a view of the lower portion of the combined laser and plasma-arc welding torch, including a synchronizing device, in accordance to the present invention.

As shown in FIG. 6, another embodiment of the present invention, torch 100 includes two electrodes 130 and 230 located in cavities 164 and 264 of insulating bush 160 and having longitudinal axes 132 and 232 which intersect central axis 111 close to section plane 124. Longitudinal axes 132 and 232 of electrodes 130 and 230 are located on the generatrix of a cone, the vertex whereof lies on central axis 111, and the base faces main body 110. In this case, in torch 100, distance between central axis 111 and the closest point of each electrode 130 and 230 is less than radius r of laser beam 114. Both electrodes 130 and 230 may be cathodes, or anodes, or one may be a cathode while the other may be an anode.

Torch 100 can include three, four or more electrodes 130, 230, whereby longitudinal axes 132 and 232 of electrodes 130 and 230, respectively, are located on the generatrix of a cone whose vertex lies on central axis 111, and wherein the base of the cone faces main body 110. For multiple electrode embodiments of torch 100, distance between central axis 111 and the closest point of each electrode 130 or 230 is similarly less than laser beam 114 radius r, for the case for torch 100 including one or two electrodes.

Main body 110 of torch 100 has an input end 240 (FIG. 4). A mechanism for directing laser beam 114 includes an optical system featuring a mechanism 250 for focusing beam 114, where the optical system is located at this input end, and laser beam 114 is focused at a point, FP, outside of torch 100, and behind section plane 124 of constricting nozzle 120. Lenses 112 and reflector 260 are examples of mechanisms for focusing laser beam 114. The embodiment of FIG. 4 includes a system of lenses 112 for focusing laser beam 114. The embodiment of FIG. 5 has a parabolic focusing reflector 260 for focusing laser beam 114.

Source of an input laser beam 114 (FIGS. 4 and 5) may be a solid state laser, a gas laser or a diode laser, where the laser operates in either continuous or pulse mode. Constricting nozzle 120 has a through aperture 122 and a conic outer surface 126, and may include a mechanism for additional constriction and stabilization of a plasma flow, such as grooves 128 located at conic outer surface 126 and at the opposite conic surface, immediately adjacent or spaced from conic outer surface 126. There may be three or more grooves 128, which are uniformly configured on conic outer surface 126 of the constricting nozzle 120 parallel to the generatrix of conic outer surface 126. The total area of grooves 128 approximately equals to the cross section area of aperture 122 of constricting nozzle 120. An example of the opposite conic surface is inner surface 152 of protective nozzle 150, the surface being concentric and spaced from conic outer surface 126 of constricting nozzle 120. Alternatively, an opposite conic surface could be the inner surface of an additional conic bush 154, which is immediately adjacent to conic outer surface 126 of constricting nozzle 120, and in the gap between constricting nozzle 120 and protective nozzle 150.

In an alternative embodiment of torch 100, illustrated in FIG. 6, a mechanism 140 is included for synchronized generation of an electric arc between electrodes 130 and 230 and workpiece 180. Mechanism 140 is in communication with a synchronizing device 280 for synchronizing pulses of input laser beam 114 with pulses of arc current. For a torch 100 including two or more electrodes 130 and 230 mechanism 140 for generating an electric arc is in communication with a commutator 290 for appropriate connection to a set of multiple electrodes.

Figure 7:
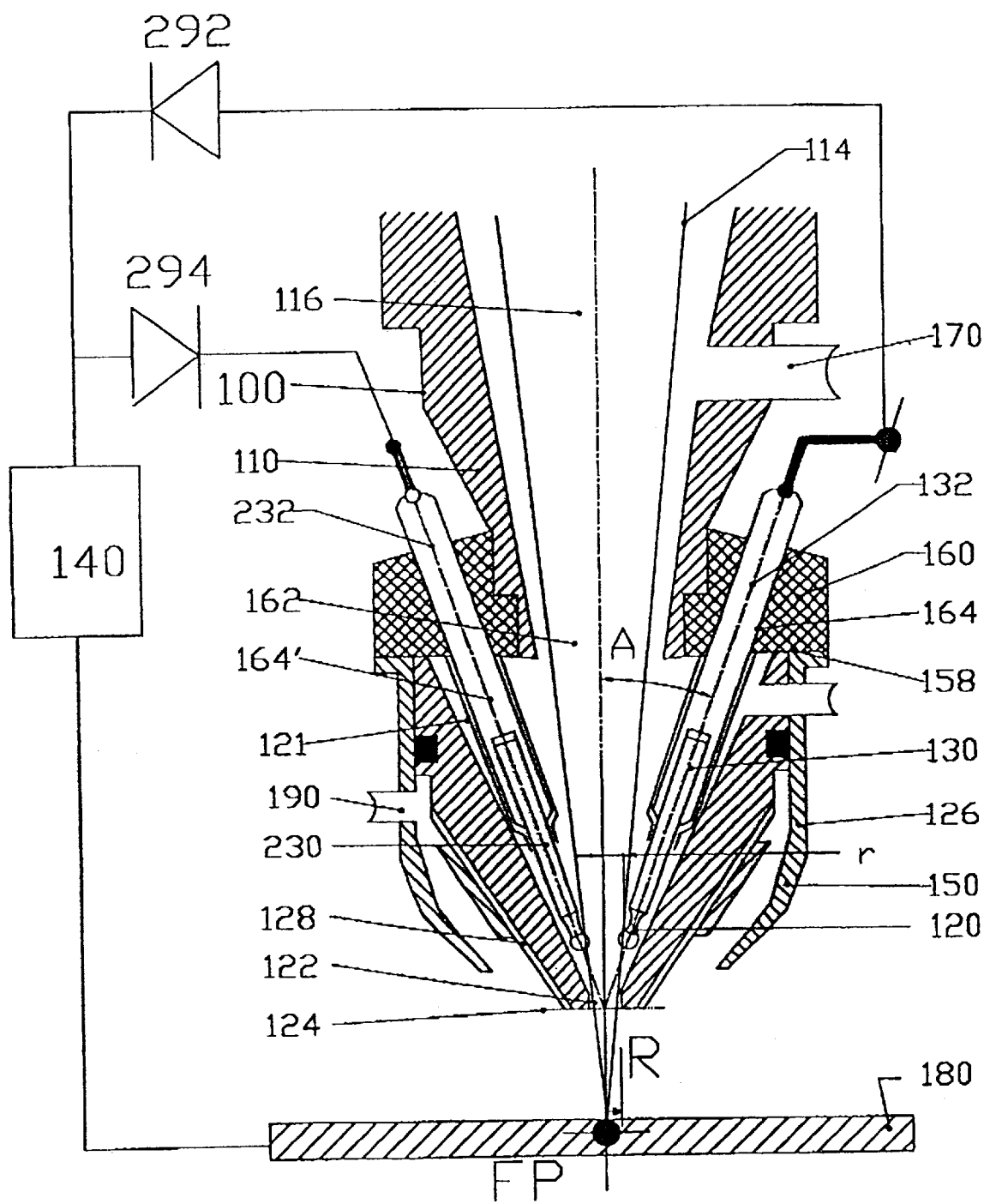
FIG. 7 is a schematic diagram illustrating a view of the lower portion of the combined laser and plasma-arc welding torch, including a commutator, in accordance to the present invention.

An example of mechanism 140 for generating an electric arc is an alternating current source connected to electrodes 130 and 230 via two diodes 292 and 294, respectively, wherein, the anode of first diode 292 is connected to a negative electrode 130 and the cathode of second diode 294, and, the cathode of second diode 294 is connected to a positive electrode 230, as illustrated in FIG. 7.

For operation of welding torch 100 of the present invention, a current is established between electrode 230 and an anode, typically workpiece 180. Laser beam 114, supplied by an external laser source (not shown) is passed through objective lens 112 (FIG. 4) causing laser beam 114 to propagate co-linearly along central axis 111 of main body 110. Constricting nozzle 120 channels a plasma flux, which is co-linear to central axis 111 and laser beam 114. As a result, a high energy density spot, i.e., very localized region, of highly concentrated energy originating from torch 100, is formed on a surface of workpiece 180. Laser beam 114 propagates along central axis 111 of main body 110, such that electrodes 130 and 230 are heated by laser beam 114. Laser beam 114 is focused to focal point, FP, outside of main body 110. In a region between main body 110 and workpiece 180, a constricted plasma jet is formed, thereby causing the laser beam and plasma jet to interact and produce a more highly constricted plasma jet, having a very high energy density, which is transmitted onto workpiece 180.

During operation of torch 100, plasma issuing from constricting nozzle 120 is additionally constricted and cooled by protective gas jets generated by a mechanism for additional constriction and stabilization of a plasma flow. Such a mechanism includes, for example, grooves 128 (FIGS. 4 and 5) located at conic outer surface 126 and at the opposite conic surface which is immediately adjacent to, or spaced away from, conic outer surface 126 of constricting nozzle 120.

As for example shown In FIG. 6, for the case of torch 100, featuring two electrodes 130 and 230, one electrode is a cathode and the other electrode is an anode, and is powered by alternating current, an electric arc ignites at a negative current half-cycle between the cathode and workpiece 180, and ignites at a positive current half-cycle between the anode and workpiece 180. In such an electrical configuration, alternating current passes through workpiece 180. During this process is the oxide layer at the surface of workpiece 180 is destroyed, which is advantageous to the welding process and improves the quality and reliability of a welded joint. Moreover, at the same time, a pulsating direct current flows through each of the electrodes, thereby reducing the thermal load on each of the electrodes, translating to extension of the lifetime of each electrode 130 and 230. A consequence of this phenomenon is that it becomes feasible to construct each electrode from a different material, such as the anode from pure tungsten, and the cathode from thoriated tungsten.

Formation of a laser-plasma discharge, important to the function of the combined laser and plasma-arc welding torch of the present invention, takes place as follows. According to the embodiments of torch 100 illustrated in FIGS. 4-7, the distance between central axis 111 and the closest point of each of electrodes 130 or 230 is less than laser beam 114 radius r. With such a geometric configuration, a finite part of laser beam 114 is absorbed by those regions of exposed surface of bulbs 200 of electrodes 130 or 230, facing torch central axis 111.

This effect results in heating of electrodes 130 or 230, thereby, increasing emission of electrons. Thus, combined effects of both electric current and heating of electrodes 130 or 230 by laser beam 114 result in emission of electrons. The plasma gas is pumped through a chamber formed between main body 110 and constricting nozzle 120, wherein the plasma gas is ionized and forms a plasma-arc. Laser beam 114 interacts with the plasma-arc along its axial direction, forming a combined laser-plasma discharge, which then interacts with workpiece 180. When laser beam 114 passes through the plasma-arc, optical absorption of some portion of the laser beam occurs, affecting the energy distribution of both the laser beam and the plasma-arc. In order for the plasma to absorb a significant quantity of laser beam energy, it is desirable that $K(\lambda)L=1$, where $K(\lambda)$ is the absorption coefficient of the plasma gas of a laser beam having wavelength $\lambda$, and L is the length of the propagation path of the laser beam through the plasma. For this effect, it is important that bulb 200 of electrodes 130 or 230 be heated by laser beam 114.

It is well known, that during the presence of an established arc in torch with a non-consumable electrode, small hot spots, for example, a cathode spot or active spot, exists on the end surface of the cathode. The full strength of welding current flows through the hot spot. The welding current supplies energy for thermal emission of electrons from the surface of the cathode. Electron emission is necessary for maintaining the welding current. Providing the electron emitting surface of cathodes 130 and 230 with additional active welding ingredients or additives is of significant importance for effective operation of cathodes 130 and 230.

In the case of simple cathode heating by arc current only, the temperature in the center of the hot spot is very high, for example, about 3700° K. High temperature leads to excessive vaporization and destruction of the cathode surface, and of the cathode. Additional external cathode heating by a laser beam leads to an increase in the size of a hot spot, a decrease in non-uniform heating, and a decrease in peak temperature of the cathode spot, because a lower density of emitted electrons is required in this case. Lower peak temperature in the cathode spot substantially increases the life time of the cathode.

In addition, thermionic emission of a cathode, for example, made of tungsten metal, is improved by alloying it with metal oxides that have very low work functions, for example, Thorium, Lanthanum, and Zirconium. The lifetime of the cathode is defined by the duration of existence of the alloy in the cathode spot. The main mechanism of is forming the source of supplying metal oxide atoms is diffusion of the atoms from the main cathode volume to the cathode surface near the region of the cathode spot. It is known that coefficients of such diffusion are a rapidly increasing function of the temperature. The temperature of a standard cathode decreases rapidly in the direction of the inner body volume of the cathode, and as a consequence, only a small part of the cathode volume supplies metal oxides to the cathode surface. The embodiment of the present invention, of the cathode with bulbs 200 at the end of the cathode featuring strap 210, results in a lower rate of temperature decrease in the direction of the cathode body volume and, leaving more cathode volume to supply metal oxide atoms. In the case of additional heating by a laser beam, the result is a larger volume near the tip of cathode being at a high temperature, whereby this larger volume at high temperature supplies more oxides during the welding process, as a consequence, cathode life time is extended.

It is known, that in an atmosphere of an inert gas, for example, Helium, as well as in an atmosphere of an active gas, for example, carbon dioxide, ignition of an arc by lower voltage, and stabilization of the ignited arc, are quite difficult to achieve. These factors are especially important for applying a combination of laser and plasma-arc technologies to $CO_2$ lasers, automatic applications, or during the welding of alloy steels. Configuring a separate flow of an inert gas, such as Argon or Xenon, in the region of each cathode tip of two or of any number of electrodes 130 and 230 enables overcoming these limitations, while maintaining the advantages associated with using other, active, gases in the main volume of the arc. Configuring such separate gas flows is realized by placement of tubes in spaces around each separate electrode. This involves the use of alternating current.

When pulsed laser beams are employed, during a pulse of laser radiation, a relatively large quantity of material evaporates from the surface of workpiece 180. This surface material is ionized by both the impinging laser irradiation and by thermal ionization in the arc. In this case, the generated plasma, featuring a large number of metal ions, absorbs a part of the laser energy. According to the embodiments of the combination laser and plasma-arc welding torch, a mechanism 140 for forming an electric arc includes generating arc current pulses of predetermined frequency and duration, one arc current pulse after another arc current pulse, where the arc current pulses are applied with a timed is pause, whereby a synchronizing device 280 (FIGS. 6 and 7) matches the predetermined frequency and the duration of the arc current pulses with pulses of the input laser beam 114 so that periods of repeating laser beam pulses are equal to periods of repeating arc current pulses, and whereby each laser beam pulse starts during the timed pause between every two successive arc current pulses and ends during the second of every two successive arc current pulses. This combined laser and plasma-arc process decreases the ionization rate of metal vapor that is generated by the action of a high power pulsed laser onto workpiece 180. In such a process, energy absorption by a metal vapor plume is reduced.

In welding fusible metals using refractory oxide films, for example, Al, Mg and their alloys, removal of the oxide films is facilitated by using alternating current in the workpiece circuit. Use of a single electrode results in rapid deterioration of the electrode. Use of at least two electrodes 130 and 230 through which there flows a current having proper polarity configuration, essentially increases durability and life times of the electrodes. Mechanism 140 for forming an electric arc of torch 100 having two electrodes 130 and 230, generates alternative pulses of current at a predetermined frequency. In this case, direct polarity current flows through one (negative) electrode, and reverse polarity current flows through the second (positive) electrode, whereby, mechanism 140 is connected to the electrodes via two diodes 292 and 294 respectively, which are connected to each other.

Under certain conditions of performing a welding process, it is necessary to generate a molten metal wave moving circularly or linearly within a welding bath that is formed on workpiece 180 under the action of a high energy density spot. This wave is formed by changing plasma column pressure on a surface region of molten metal in a welding bath. To accomplish this, as illustrated in FIG. 6, mechanism 140 for forming an electric arc from a torch featuring two electrodes 130 and 230, includes a commutator 290, whereby, commutator 290 connects electrodes 130 and 230 to mechanism 140 for forming arc of alternating current having a known sequence and frequency. Mechanism 140 for forming an electric arc from torch 100 featuring three electrodes, includes commutator 290, which connects the three electrodes to a mechanism for forming an arc of alternating current of predetermined sequence and frequency, where each electrode is connected during two successive intervals during the time of a complete operation cycle of commutator 290.

As laser beam 114 interacts with and is absorbed by the plasma, plasma temperature and current density along the laser beam axis are increased. The stability of the plasma-arc is increased, partially as a result of the coupling of electric and magnetic fields associated with increased current density within the plasma. A decrease in the operating voltage of the plasma-arc may be realized due to the modified electric field.

In addition to these features of direct interaction between the laser beam and the plasma, there are indirect interactions between laser beam 114 and workpiece 180, which act to further increase the energy density, and therefore, coupling efficiency, at the surface of workpiece 180. As laser beam 114 impinges on workpiece 180, ablation of workpiece 180 occurs. As the surface of workpiece 180 vaporizes, it forms a surface plasma jet. The ionization potential of the surface jet is lower than that of commonly used orifice and shielding gases. As a result, the degree of ionization of the surface plasma and the electro-conductivity of the plasma at the location above the laser spot on workpiece 180 increases. Due to this increase, current from the electric arc flows into this region. This acts to further constrict the plasma-arc and increase energy density and coupling efficiency at the location where the arc impinges on workpiece 180.

The main physical effects that take place in this augmented interaction between laser beam 114 and the plasma-arc include (?) constriction of the plasma-arc to produce an increased energy density; (ii) reduction of the heat affected zone, or hot spot, on workpiece 180; (iii) increase in plasma temperature, (iv) increase in plasma-arc stability; and, (v) reduction in energy consumption. The total net effect is to produce a higher energy density spot on workpiece 180 and to more efficiently couple, or transfer, the combined energy of the laser beam and the electric arc to workpiece 180. Energy of laser beam 114 is more efficiently coupled to workpiece 180 by several factors. The formation of a keyhole by the plasma-arc, or plasma-jet, acts as a black surface radiator for laser beam 114, thereby increasing absorption of laser beam 114 energy into workpiece 180. A greater percentage of laser beam energy is deposited onto workpiece 180 because the laser energy is not needed to form the keyhole. Additionally, more efficient coupling occurs because the induced metal, or surface, plasma is not needed to maintain the keyhole as compared to normal laser welding processes such as augmented plasma coupling.

Similarly, the plasma-arc, or plasma-jet, is more efficiently coupled to workpiece 180 because there occurs laser induced ionization along the plasma-arc axis. The plasma-arc, or plasma-jet, is heated by laser beam 114 and thus operates at a lower voltage/current than would otherwise be necessary. In welding torch 100, the laser generated ionized chamber, encompassing the volumetric region from main body 110 to constricting nozzle 120 provides a high electron density region having lower electrical resistance to the plasma-arc. This combined laser and plasma-arc interaction also has the additional effect of constricting and stabilizing the plasma-arc, where a relatively small increase in the electron density is sufficient to achieve these effects.

The inventors investigated physical characteristics and heat transfer properties of coupling laser energy to a plasma-arc or plasma-jet, as a function of plasma conditions, including temperature and electron is density of the plasma. Parametric studies included characterization of the plasma-arc by measuring temperature and electron density gradients, spatially, using an optical pyrometer and a laser probe-beam deflection technique. Testing was directed towards increasing the energy density at the surface of a workpiece for a given laser source, by determining optimum plasma-arc conditions, leading to the use of a lower power and more energy efficient laser source.

It was determined by the inventors that, to achieve better coupling of laser-plasma discharge to a workpiece, for either a solid state laser, gas laser, or diode laser, it is desirable that plasma-arc power be between 0.1 and 10, preferably between 0.25 and 5, more preferably, between 0.5 and 2 times the value of the laser power. Under conditions described for operation of the combination laser and plasma-arc welding torch of the present invention, it is possible to conduct welding operations with a solid state laser, gas laser, or diode laser, having approximately one-half the power required to perform the same operation when a laser is used alone as a welding device.

The following characteristics and parameters of a welding operation applicable to using the combination welding torch and method of the present invention were also studied by the inventors: (i) intensity and optical absorption coefficient of the laser beam in the plasma-arc as a function of laser power, electric current, voltage, mixture and flow of the orifice and shield gases; and (ii) plasma-arc temperature on the discharge axis as a function of laser power. Results of these investigations indicate that the effect of increasing laser power in relation to the characteristics of the plasma-arc arc primarily due to changes in the absorption coefficient of the plasma. Furthermore, although an increase in laser power generally results in an increase in plasma temperature, there is a threshold level beyond which further increases in laser power results in a reduction in the intensity of the combined discharge, and hence in the power density at the surface of the workpiece.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A torch used for welding, combining laser and plasma-arc technologies, and capable of efficiently producing high energy densities at a surface of a workpiece, the torch comprising:
   (a) a main body having an inner cavity, optically transparent input and output ends and a central axis;
   (b) a source of an input laser beam, for inputting said input laser beam through said input end of said main body;
   (c) a first mechanism being in said main body for directing said input laser beam co-linearly with said central axis, said input laser beam having a beam radius at said optically transparent output end;
   (d) an electrical insulating bush being disposed at said output end of said main body, including:
      (i) an aperture being co-linear with said central axis,
      (ii) at least one cavity for locating an electrode, and
      (iii) an output end;
   (e) a constricting nozzle having a proximal end and a distal end, said constricting nozzle being located at said insulating bush output end, said constricting nozzle having a through aperture being centered on said central axis and a section plane at said distal end, said section plane being perpendicular to said central axis, said through aperture of said constricting nozzle having a radius greater than said input laser beam radius;
   (f) at least one electrode being located in a cavity of said insulating bush and having a longitudinal axis intersecting said central axis close to said section plane of said constricting nozzle, said at least one electrode longitudinal axis and said central axis forming an acute angle facing said main body;
   (g) a second mechanism for providing a plasma gas inside the torch, in a region between said constricting nozzle and said at least one electrode; and
   (h) a third mechanism for forming an electric arc between said at least one electrode and the workpiece, thereby causing said plasma gas to become plasma issuing from said constricting nozzle and interacting with said laser beam issuing from said main body to form a combined plasma laser discharge,
   wherein said acute angle is between 4 and 60 grad.

2. A torch used for welding, combining laser and plasma-arc technologies, and capable of efficiently producing high energy densities at a surface of a workpiece, the torch comprising:
   (a) a main body having an inner cavity, optically transparent input and output ends and a central axis;
   (b) a source of an input laser beam, for inputting said input laser beam through said input end of said main body;
   (c) a first mechanism being in said main body for directing said input laser beam co-linearly with said central axis, said input laser beam having a beam radius at said optically transparent output end;
   (d) an electrical insulating bush being disposed at said output end of said main body, including:
      (i) an aperture being co-linear with said central axis,
      (ii) at least one cavity for locating an electrode, and
      (iii) an output end;
   (e) a constricting nozzle having a proximal end and a distal end, said constricting nozzle being located at said insulating bush output end, said constricting nozzle having a through aperture being centered on said central axis and a section plane at said distal end, said section plane being perpendicular to said central axis, said through aperture of said constricting nozzle having a radius greater than said input laser beam radius;
   (f) at least one electrode being located in a cavity of said insulating bush and having a longitudinal axis intersecting said central axis close to said section plane of said constricting nozzle, said at least one electrode longitudinal axis and said central axis forming an acute angle facing said main body;
   (g) a second mechanism for providing a plasma gas inside the torch, in a region between said constricting nozzle and said at least one electrode; and
   (h) a third mechanism for forming an electric arc between said at least one electrode and the workpiece, thereby causing said plasma gas to become plasma issuing from said constricting nozzle and interacting with said laser beam issuing from said main body to form a combined plasma laser discharge,
   wherein said acute angle is between 5 and 45 grad.

3. A torch used for welding, combining laser and plasma-arc technologies, and capable of efficiently producing high energy densities at a surface of a workpiece, the torch comprising:

(a) a main body having an inner cavity, optically transparent input and output ends and a central axis;
(b) a source of an input laser beam, for inputting said input laser beam through said input end of said main body;
(c) a first mechanism being in said main body for directing said input laser beam co-linearly with said central axis, said input laser beam having a beam radius at said optically transparent output end;
(d) an electrical insulating bush being disposed at said output end of said main body, including:
  (i) an aperture being co-linear with said central axis,
  (ii) at least one cavity for locating an electrode, and
  (iii) an output end;
(e) a constricting nozzle having a proximal end and a distal end, said constricting nozzle being located at said insulating bush output end, said constricting nozzle having a through aperture being centered on said central axis and a section plane at said distal end, said section plane being perpendicular to said central axis, said through aperture of said constricting nozzle having a radius greater than said input laser beam radius;
(f) at least one electrode being located in a cavity of said insulating bush and having a longitudinal axis intersecting said central axis close to said section plane of said constricting nozzle, said at least one electrode longitudinal axis and said central axis forming an acute angle facing said main body;
(g) a second mechanism for providing a plasma gas inside the torch, in a region between said constricting nozzle and said at least one electrode; and
(h) a third mechanism for forming an electric arc between said at least one electrode and the workpiece, thereby causing said plasma gas to become plasma issuing from said constricting nozzle and interacting with said laser beam issuing from said main body to form a combined plasma laser discharge, wherein said acute angle is between 5 and 25 grad.

4. The torch according to claim 3; wherein said acute angle is between 5 and 15 grad.

* * * * *